United States Patent [19]

Baseghi et al.

[11] Patent Number: 5,134,412
[45] Date of Patent: Jul. 28, 1992

[54] APPARATUS AND METHOD FOR SIMULATING RADIO FREQUENCY EMITTERS

[75] Inventors: Behshad Baseghi; Mohammad Mazooji, both of Santa Barbara; Matt S. Skefich, Goleta; Graham T. Hall, Santa Barbara, all of Calif.

[73] Assignee: Raytheon Company, Lexington, Mass.

[21] Appl. No.: 748,475

[22] Filed: Aug. 22, 1991

[51] Int. Cl.5 .......................... G09B 9/00; G01S 7/40
[52] U.S. Cl. ....................................... 342/169; 434/2
[58] Field of Search ................ 342/169, 170, 171, 13, 342/14, 16, 17; 434/2

[56] References Cited

U.S. PATENT DOCUMENTS

| 4,423,418 | 12/1983 | Pearlman | 434/2 X |
| 4,666,407 | 5/1987 | Jones | 434/2 |
| 4,730,191 | 3/1988 | Groebke | 342/169 |
| 4,982,196 | 1/1991 | Thomas et al. | 342/172 |
| 5,010,342 | 4/1991 | Jones, Jr. | 342/169 |
| 5,039,991 | 8/1991 | Boese et al. | 342/420 |
| 5,064,376 | 11/1991 | DeCrescent | 434/2 |

Primary Examiner—John B. Sotomayor
Attorney, Agent, or Firm—Judith A. Caplan; Richard M. Sharkansky

[57] ABSTRACT

A low cost simulator for training electronic warfare operators to recognize signatures of various emitters. The simulator consists of a card which can be plugged into an IBM PC or compatible computer. Through the computer, various characteristics of one, or a plurality of emitters are entered. The simulator, using an existing digital signal processing (DSP) chip generates a replica of a signal received by a radar system receiver from one, or a plurality of emitters.

10 Claims, 7 Drawing Sheets

APPARATUS AND METHOD FOR SIMULATING RADIO FREQUENCY EMITTERS

This invention was made with Government support under Contract No. N00024-89-G-5500 awarded by the U.S. Department of the Navy. The Government has certain rights in this invention.

BACKGROUND OF THE INVENTION

This invention relates to signal simulators and more particularly to apparatus and a method for simulating radio frequency emitters.

As is known in the art, it is sometimes necessary to detect the presence of emitters of radio frequency (RF) energy, and then to identify, or characterize such RF emitters. One such system typically includes a receiver, for receiving RF energy transmitted by emitters, a digital display, and headphones. With such a system, an operator can visually monitor the locations of RF energy emitters relative to the receiver. Additionally, an audible signal is provided and coupled to the headphones. In this way, the operator of the system can hear the audio signatures associated with the RF emitters.

One way known in the art for training operators of such systems to recognize audio signatures associated with various RF emitters is to provide actual RF energy sources to be received by the system. Such training technique, however, may be impractical and/or costly.

SUMMARY OF THE INVENTION

It is an object of the present invention to provide a signal simulator for generating a replica of a signal received by a radar system in the presence of an RF energy emitter.

It is a further object to provide a signal simulator for generating a replica of a signal received by a radar system in the presence of a plurality of RF energy emitters.

A further object is to provide a method for simulating a signal received by a radar system in response to RF energy emitters.

It is a further object to provide a signal simulator for use in training radar system operators to identify RF energy emitters.

A still further object is to provide a signal simulator for simulating a signal received by a radar system in response to RF emitters, wherein the simulated signal can be used with a conventional headphone set.

These and other objects are attained, generally, by providing apparatus for simulating a signal received by a radar system in response to RF energy transmitted by an emitter. The apparatus comprises a storage device for storing a first set of parameter values representing RF energy pulse characteristics of the emitter and a second set of parameter values representing antenna characteristics of the emitter. The apparatus further includes a signal generator, coupled to the storage device, for generating the simulated signal representative of the received signal in response to the first and second sets of parameter values.

With this arrangement, the simulated signal provides a replica of the signal received by a radar system in response to the presence of an RF energy emitter. Thus, the apparatus simulates the presence of actual RF energy emitters The simulated signal can be coupled to a visual display and headphones of a radar system, or equivalent hardware, in order to train operators of such a system to recognize the audio signatures associated with a variety of RF emitters.

In accordance with a further feature of the invention, a first portion of the first set of parameter values corresponds to a first RF energy emitter and a second portion thereof corresponds to a second RF energy emitter. With this arrangement, the simulated signal is representative of a signal received by a radar system in response to the presence of a plurality of RF energy emitters.

BRIEF DESCRIPTION OF THE DRAWINGS

The foregoing features of this invention, as well as the invention itself, may be more fully understood from the following detailed description of the accompanying drawings in which.

DESCRIPTION OF THE PREFERRED EMBODIMENTS

Figure 1:
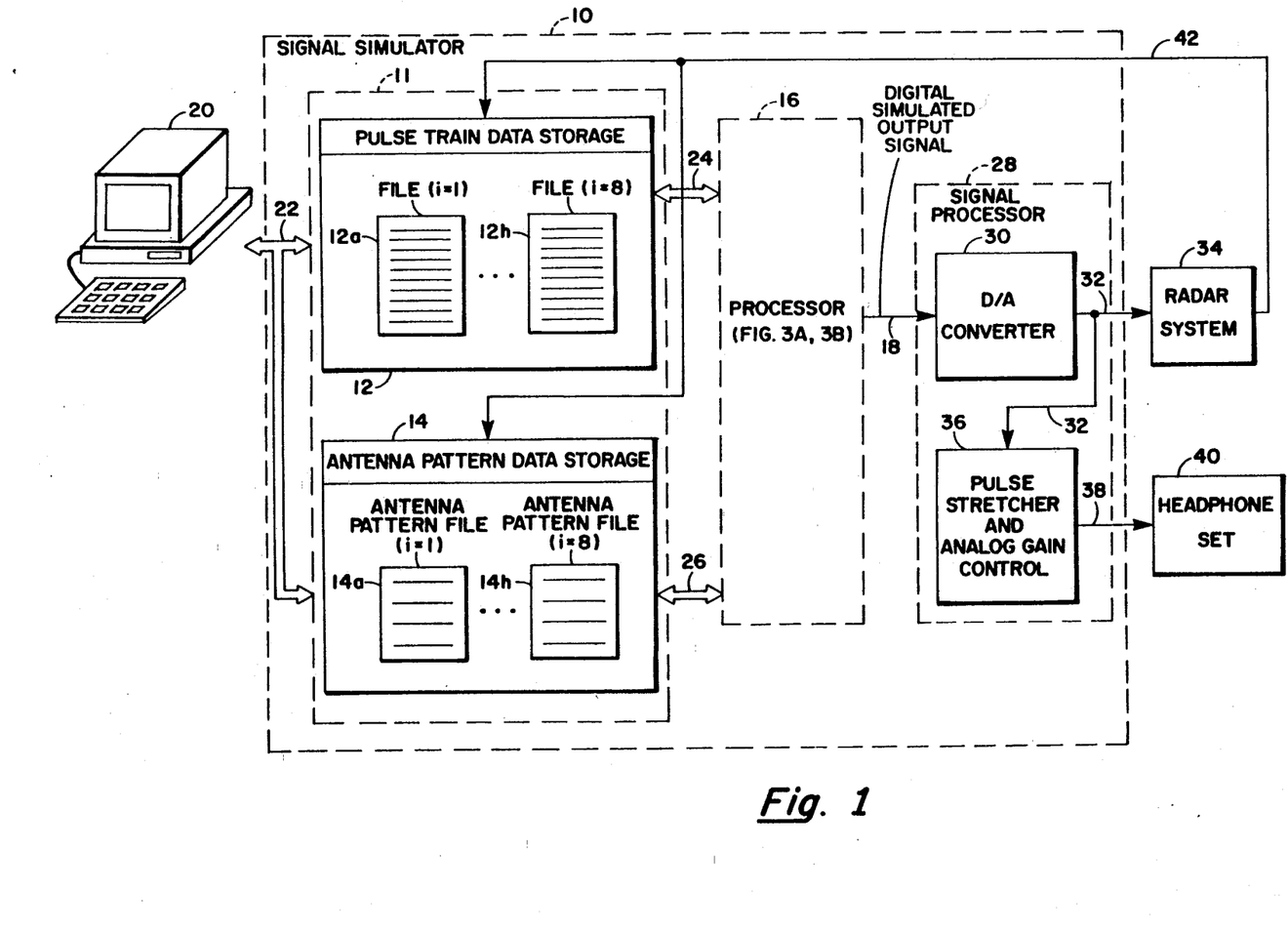
FIG. 1 is a block diagram of a signal simulator in accordance with the present invention.

Referring now to FIG. 1, a signal simulator 10 for providing a replica of a signal received by a radar system in response to the presence of an RF energy emitter is shown. An RF energy emitter emits pulses of RF energy and has an antenna which may spatially scan, as is known. Signal simulator 10 includes a data storage unit 11 having a first data storage device 12 for storing a set of parameter values representing the pulse train characteristics of one, or a plurality of RF emitters sought to be simulated. Data storage device 12 will, hereinafter, be referred to as pulse train data storage device 12. Note that when the presence of a plurality of RF energy emitters is to be simulated, pulse train data storage device 12 includes a plurality of files 12a-12h, each one corresponding to one of the plurality of RF emitters and including a set of parameter values associated with such corresponding RF emitter. Data storage unit 11 further includes a data storage device 14 for storing a set of parameter values representing the antenna characteristics of one, or a plurality of RF emitters sought to be simulated, such storage device 14, hereinafter, being referred to as an antenna data storage device 14. Again, when the presence of a plurality of RF emitters is to be simulated, antenna data storage device 14 contains a corresponding plurality of files 14a-14h, each one including a set of parameter values associated with the antenna characteristics of the corresponding one of the plurality of RF emitters. In other words, each one of a plurality of RF emitters sought to be simulated has, associated therewith, a file 12a-12h stored in pulse train data storage device 12 and including a set of pulse train parameter values and a file 14a–14h stored in antenna data storage device 14 and including a set of antenna parameter values. A processor 16 is coupled to pulse train data storage device 12 and antenna data storage device 14 by signal bus 24 and 26, respectively, as shown. Processor 16 generates a digital simulated signal, carried by signal line 18, replicating a signal received by a radar system in response to the presence of one, or a plurality of RF energy emitters.

Signal simulator 10 is coupled to a computer 20, here, a commercially available IBM personal computer, or an equivalent thereof. With computer 20, the pulse train parameter values and the antenna parameter values associated with the RF emitters to be simulated are entered into data storage unit 11 via interface bus 22. More particularly, interface bus 22 couples computer 20 to pulse train data storage device 12 for storage of the pulse train parameter values and to antenna data storage device 14 for storage of the antenna parameter values, as shown. Storage devices 12 and 14 may be any suitable memory device, such as a Random Access memory (RAM), and further may be separate devices or different portions of a single memory device.

In operation, computer 20 is used to input, or enter data corresponding to one, or a plurality of RF emitters sought to be simulated. Thus, typically the person who is training operators of a radar system to identify emitters of RF energy will enter such data at computer 20. More particularly, for each RF emitter to be simulated, a set of parameter values representing the pulse train characteristics of the emitter is entered into a file 12a–12h of the pulse train data storage device 12. Also for each of such emitters, a set of parameter values representing to the antenna characteristics thereof is entered into a file 14a–14h of antenna data storage device 14. Here, simulator 10 is designed to simulate the presence of up to eight RF energy emitters. Thus, the operator of computer 20 can input into simulator 10, a set of pulse train parameter values and a set of antenna parameter values for as many as eight RF emitters.

Figure 3A:
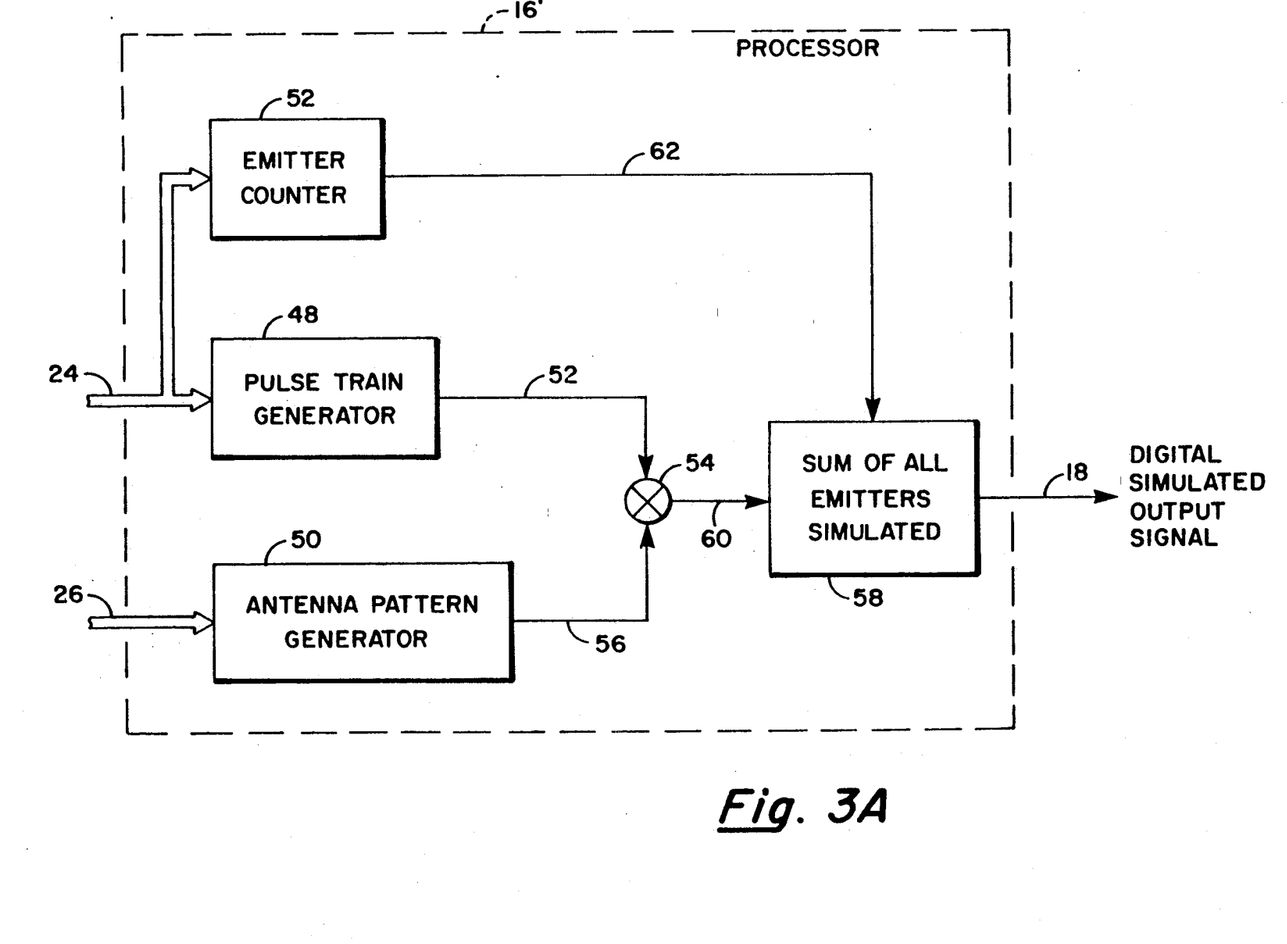
FIG. 3A is a block diagram of a first embodiment of a processor used within the signal simulator of FIG. 1.
Figure 3B:
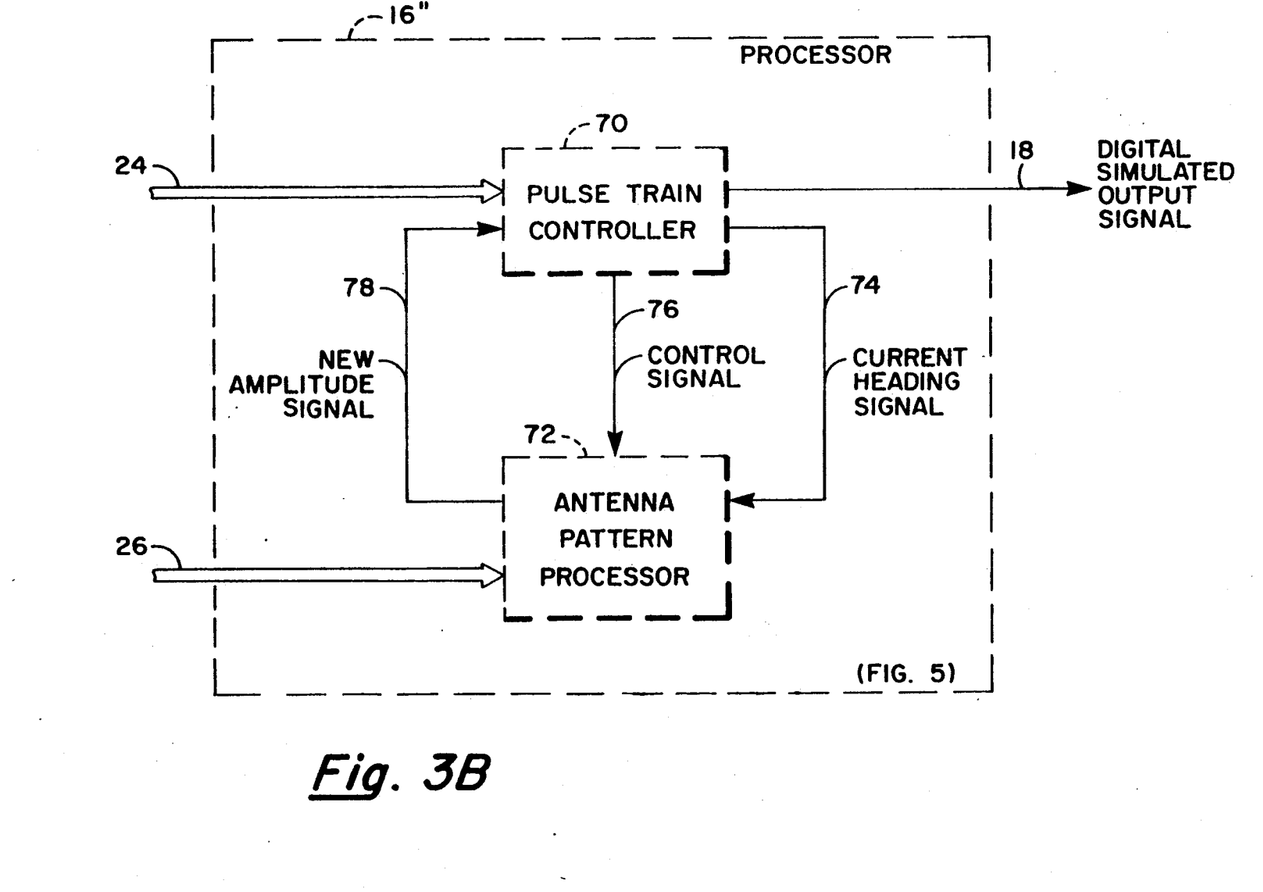
FIG. 3B is a block diagram of an alternate embodiment of the processor of FIG. 3A.

Processor 16 is coupled to pulse train data storage device 12 via signal bus 24 and to antenna data storage device 14 via signal bus 26, as shown. Different embodiments of processor 16 (i.e. 16' and 16'') are shown in FIGS. 3A and 3B, respectively, and are described in conjunction therewith. Suffice here to say that processor 16 generates, at an output thereof coupled to signal line 18, a simulated signal replicating a signal received by a radar system in response to the presence of between one and eight RF emitters. More particularly, processor 16 includes means for generating a digital simulated output signal in response to the pulse train data and the antenna data stored in devices 12 and 14, respectively.

Output signal line 18 is further coupled to a signal processor 28. More particularly, output signal line 18 is coupled to a digital-to-analog converter 30 contained within signal processor 28. Digital-to-analog converter 30 converts the digital simulated output signal of signal line 18, into an analog replica thereof. The analog version of the simulated signal (i.e. the analog simulated output signal) is then provided, via a signal line 32, to a radar system 34. The analog simulated output signal carried by signal line 32 is further processed by the system 34 and coupled to headphones thereof. In other words, the analog simulated output signal provided to the system 34 replaces a signal received and processed by such system 34 in the presence of RF emitters.

Signal simulator 10 may also be used without a radar system 34. More particularly, the further processing of the analog simulated output signal performed within the system 34 (i.e. before such simulated signal is coupled to headphones of such system 34) is duplicated in signal processor 28 of simulator 10. Specifically, the analog simulated output signal, carried by line 32, is further coupled to a pulse stretcher and analog gain control circuit 36, as shown. Pulse stretcher and analog gain control circuit 36 converts the relatively high frequency (for example, several MHz) analog simulated output signal carried by signal line 32 into a lower frequency, audible (i.e. less than 20 KHz) simulated output signal, carried by signal line 38. Thus, the audible simulated output signal of signal line 38, is suitable for coupling to a conventional headphone set 40, as shown.

This feature of providing a high frequency digital simulated output signal compatible with a radar system 34, and a low frequency, audible simulated output signal compatible with conventional headphones 40 is desirable since a trainee may not have access to a radar system 34. In other words, when a radar system 34 is not available for training purposes, training can take place in a classroom environment with the only hardware required being an IBM compatible computer 20, the signal simulator 10, and a headphone set 40. Moreover, the electronics of simulator 10 are readily disposed on a printed circuit board adaptable for plugging into an available slot in the computer 20.

As is conventional, radar system 34 may include a feature whereby an operator of the system 34 can select a desired one of a plurality of RF emitter representations shown on a digital display. In response to such selection, only the audio signature associated with the selected RF emitter will be coupled to the headphones of such system 34. In order to realize this selection feature when the system 34 is used in conjunction with simulator 10, system 34 provides an emitter selector control signal to simulator 10, via signal line 42, as shown.

More particularly, emitter selector control signal line 42 is coupled to the pulse train data storage device 12 and the antenna data storage device 14. In response to such control signal, the sets of parameter values associated with non-selected RF emitters and stored in devices 12 and 14 are ignored, or deleted therefrom. In other words, when the emitter selector control signal indicates the selection of one of a plurality of emitters, the remaining, or nonselected emitters are no longer coupled to processor 16 for simulation. Thus, processor 16 is responsive only to the set of pulse train parameter values and the set of antenna parameter values associated with the selected emitter.

Figure 2A:
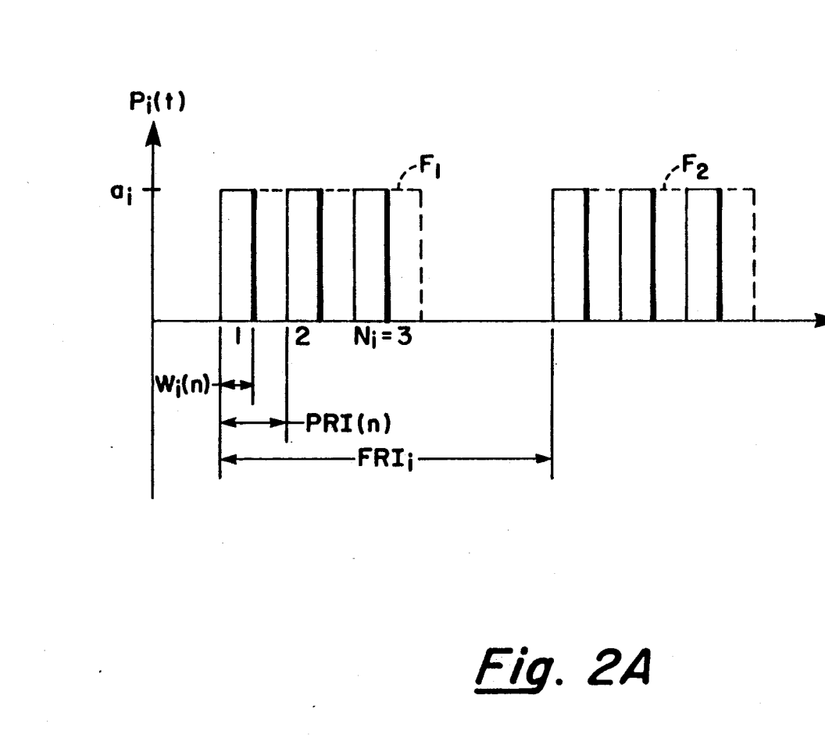
FIGS. 2A-2B show an exemplary pulse train signal and an exemplary antenna pattern signal associated with an RF emitter simulated by the signal simulator of FIG. 1.

In order to more readily understand the operation of processor 16, the pulse train parameter values stored in device 12 and the of antenna parameter values stored in device 14 will now be described in conjunction with FIGS. 2A and 2B, respectively. Referring first to FIG. 2A, a pulse train signal $P_i(t)$ representing the pulse train characteristics of a simulated RF emitter (i), where (i) is between one and eight, is shown. In other words, pulse train signal $P_i(t)$ is representative of the pulses of RF energy transmitted by emitter (i). Parameter value a refers to the amplitude or magnitude of the pulses of RF energy transmitted by emitter (i). As is known, an RF emitter transmits groups of pulses, referred to frames, in a repeating or periodic fashion, as shown in FIG. 2A by frames $F_1$ and $F_2$. Referring to the group of pulses within frame $F_1$, the number of pulses per frame for emitter (i) is represented by parameter value $N_i$. For example, the number of pulses per frame for emitter (i), is here, shown to be three. As is known, there is a pulse repetition interval (PRI) associated with each pulse within a given frame. Thus, there may be $N_i$ different PRIs within a given frame. Parameter value PRI(n) represents the PRI value for pulse n, where n refers to one of the $N_i$ pulses (i.e. $n=0,1,\ldots N_i$). The width of each of the pulses in a given frame is labelled by parameter value $W_i(n)$, again where n refers to one of the $N_i$ pulses. An offset value representing the offset of a pulse from the start of a frame may also be given. The frames also have a repetition rate associated therewith, referred to hereinafter as a frame repetition interval (FRI). Parameter value $FRI_i$ thus refers to the frame period associated with emitter (i).

An operator at computer 20 enters a value for each of the parameters set forth above in order to define the pulse train characteristics comprising $P_i(t)$. Such entered values for emitter (i) comprise the set of parameter values stored in a file 12a–12h of pulse train data storage device 12 (FIG. 1). Another parameter associated with pulse train $P_i(t)$ is a parameter representing a value of jitter between pulses in a given frame. Here, it is assumed that the pulse jitter is a random process and, thus, the pulses are randomly offset in order to obtain the desired pulse jitter.

Figure 2B:
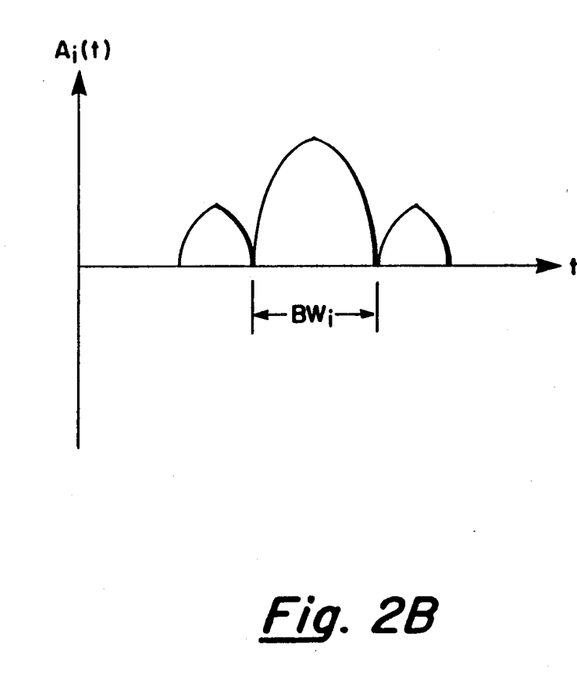

Referring now to FIG. 2B, an antenna pattern signal $A_i(t)$ representing the antenna characteristics of emitter (i) is shown. Here, the antenna pattern signal $A_i(t)$ is based on a cosine aperture distribution given by the following equation:

$$A(Z) = \cos^n(\pi z/2) \quad (1)$$

Essentially all modern radars can be suitably represented by A(Z), where "n" is an integer equal to 0,1,2,3, or 4. The antenna pattern signal $A_i(t)$ is then given by:

$$A_i(t) = \int_{-a/2}^{a/2} A(Z)\exp(j2\pi\sin\phi/\lambda)dZ \quad (2)$$

where "a" is the aperture width associated with RF emitter (i) and $\lambda$ is the RF carrier wavelength associated with such emitter (i). More particularly, the relationship between the aperture width "a" and $\lambda$ is given by:

$$a = 4\lambda \quad (3)$$

With the above equations and values for "n" and $\lambda$ (or a), antenna pattern signal $A_i(t)$ may be computed. However, operators of computer 20 may not be familiar with the relationship between values of "n" and the desired antenna pattern signal $A_i(t)$. Thus, an operator may be given a choice of entering values for "n" and $\lambda$ (or a) or values of beamwidth ($BW_i$) and sidelobe level, the latter values typically being more familiar to the operator.

In addition to the parameter values mentioned above and provided by an operator of computer 20, the following parameter values are also entered by such operator to comprise a set of antenna parameters associated with an RF emitter. An initial angle of offset of the RF emitter relative to the radar receiver (and more particularly, to the boresight thereof) is entered. Also entered is a parameter indicating the type of scanning associated with the antenna of the RF emitter. More particularly, the possible types of scanning are a circular scan in which the antenna spacially scans in a circular pattern, a steady scan in which the antenna is stationary, and a sector scan in which the antenna scans back and forth within angular limits. Note that if sector scanning is indicated, the operator of computer 20 also enters the angular limits associated with the scan pattern. Also entered is a parameter value indicating the rate at which the emitter's antenna scans and, optionally, an antenna pattern identification parameter, the relevance of which is described below in conjunction with FIG. 3A.

Referring now to FIG. 3A, a first embodiment 16' of processor 16 is shown to include a pulse train generator circuit 48 and an antenna pattern generator circuit 50. More particularly, pulse train generator 48 is coupled to the pulse train data storage device 12 (FIG. 1) by signal bus 24. Signal bus 24 is further coupled to an emitter counter circuit 52, as shown. Antenna pattern generator 50 is coupled to antenna data storage device 14 (FIG. 1) via signal bus 26. Pulse train generator 48 has an output signal line 52 coupled to a multiplier circuit 54, as shown. Multiplier 54 is also fed by an output signal line 56 of antenna pattern generator 50. The output of multiplier circuit 54 is coupled to a summing circuit 58 by signal line 60. Also coupled to summing circuit 58 is an output of emitter counter circuit 52, via signal line 62, as shown. The digital simulated output signal referred to above and carried by signal line 18 is provided at an output of summing circuit 58.

In operation, in response to the set (or sets) of parameter values stored in device 12, pulse train generator 48 computes and stores between one and eight pulse train signals, $P_i(t)$, corresponding to between one and eight RF emitters to be simulated. Similarly, in response to the set (or sets) of parameter values stored in device 14, antenna pattern generator 50 may compute and store between one and eight antenna pattern signals, $A_i(t)$, corresponding to between one and eight RF emitters to be simulated. However, because there are relatively few different antenna patterns associated with most RF emitters, antenna pattern generator 50 includes an additional storage device, here a Programmable Read Only Memory device (i.e. a PROM), for storing a plurality of pre-computed antenna pattern signals. Note that alternatively, a RAM may be used to store the precomputed antenna pattern signals. Here, thirty-two precomputed antenna pattern signals are stored. In other words, preselected values of n and $\lambda$ (or a) are used to compute a selection of, here thirty-two antenna pattern signals, digital representations of which are loaded into the additional storage device of antenna pattern generator 50. This look-up table of different antenna patterns is desirable since the added computation associated with generating such patterns during the simulation is eliminated. The antenna pattern identification parameter mentioned above in conjunction with FIG. 2B may be used to select, from the plurality of stored antenna pattern signals, a desired signal to be associated with each RF emitter to be simulated. Thus, an operator of computer 20 may be given the option of entering, for each RF emitter to be simulated, either (1) a value of n and $\lambda$ (or a), (2) a value of beamwidth (BWi) and sidelobe level, or (3) an antenna pattern identification parameter, in order to define or select an antenna pattern to be associated with such emitter.

Simply stated, processor 16 multiplies each pulse train signal $P_i(t)$ with the corresponding antenna pattern signal $A_i(t)$ (i.e. those signals associated with the same RF emitter to be simulated) to provide the simulated output signal on line 18. The multiplication is, here, achieved digitally by sampling pulse train signal $P_i(t)$ and the corresponding antenna pattern signal $A_i(t)$ simultaneously to provide a corresponding sample of the digital simulated output signal carried by signal line 18. However, this simple process becomes somewhat complicated when more than one emitter is sought to be simulated. The operation of processor 16' in the simulation of multiple emitters is easier understood by referring to FIG. 4 in which the effects of the antenna patterns are exaggerated for ease of understanding.

Figure 4:
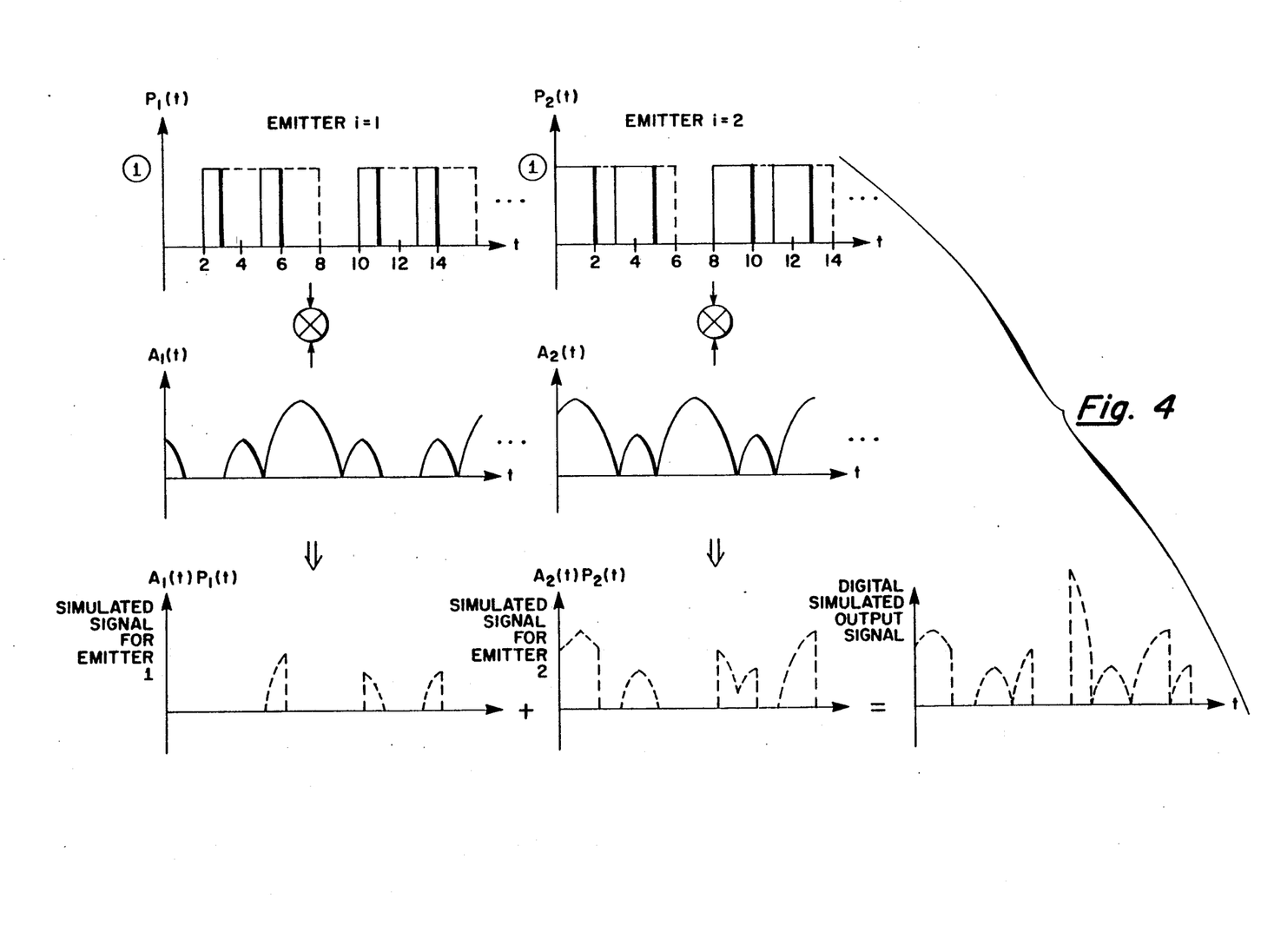
FIG. 4 shows exemplary pulse train signals and exemplary antenna pattern signals associated with two RF emitters simulated by the signal simulator of the present invention.

In FIG. 4, exemplary pulse train signals $P_1(t)$ and $P_2(t)$ are shown, such pulse train signals corresponding to two RF emitters (i.e. emitters one and two) to be simulated. Also shown in FIG. 4 are the antenna pattern signals $A_1(t)$ and $A_2(t)$ associated with emitters one and two, respectively. The digital simulated output signal carried by signal line 18 is also shown and labelled in FIG. 4. The manner of providing the digital simulated output signal will now be described.

At a given time, for example at $t=t_1$, a sample of pulse train signal $P_1(t)$ (i.e. $P_1(t_1)$) is coupled to multiplier 54 by signal line 52. Also at time $t=t_1$, a sample of antenna pattern signal $A_1(t)$ (i.e. $A_1(t_1)$) is coupled to multiplier 54 by signal line 56. The product of such samples (i.e. $P_1(t_1)A_1(t_1)$) is coupled to summing circuit 58 by signal line 60 and is stored therein. Subsequently, a sample of pulse train signal $P_2(t)$ corresponding to time $t=t_1$ is coupled to multiplier 54 by signal line 52 and a sample of antenna pattern signal $A_2(t)$ corresponding to $t=t_1$ is coupled to multiplier 54 by signal line 56. The product of such samples (i.e. $P_2(t_1)A_2(t_1)$) is coupled to summing circuit 58 by signal line 60 and is also stored therein Emitter counter circuit 52 generates a control signal on line 62 indicative of the number of emitters (i) being simulated. In the present example, the control signal indicates that two emitters are being simulated. In response to such control signal, summing circuit 58 sums the two products stored therein. In other words, the sample of the digital simulated output signal corresponding to time $t=t_1$ is equivalent to $P_1(t_1)A_1(t_1)+P_2(t_1)A_2(t_1)$. The above described process is repeated to provide consecutive samples of the digital simulated output signal carried by signal line 18.

The above described process for providing the digital simulated output signal can be similarly applied to (i) emitters, here where (i) is between one and eight. In the general case of (i) emitters, the digital simulated output signal can be represented by:

$$\sum_{i=1}^{8} P_i(t)A_i(t). \quad (4)$$

As mentioned, emitter counter circuit 52 provides a control signal indicative of the number of simulated emitters (i) and, in response to such control signal, summing circuit 58 adds (i) products to generate a sample of the digital simulated output signal.

Processor 16' as shown in FIG. 3A and described above, requires a relatively large amount of storage, or memory in order to store the plurality of pulse trains $P_i(t)$ associated with the plurality of RF emitters, as well as the antenna pattern signals $A_1(t)$ associated with such emitters. Moreover, such a processing scheme may be somewhat cumbersome due to the amount of mathematical manipulations required to provide the digital simulated output signal.

Referring now to FIG. 3B, an alternate embodiment 16" of processor 16 is shown. In view of the following description of processor 16", it will become apparent that significantly less memory and fewer mathematical manipulations are required (as compared to processor 16' of FIG. 3A) in order to provide the digital simulated output signal carried by signal line 18.

Referring now to FIG. 3B, processor 16" is shown to include a pulse train controller 70 and an antenna pattern processor 72. Pulse train controller 70 is coupled to pulse train data storage device 12 (FIG. 1) by signal bus 24 and antenna pattern processor 72 is coupled to antenna data storage device 14 (FIG. 1) by signal bus 26. The digital simulated output signal carried by signal line 18 and shown above in FIG. 4, is provided at an output of pulse train controller 70. Antenna pattern processor 72 is disposed in a feedback relationship with pulse train controller 70, as shown. More particularly, a signal line 74 is coupled from pulse train controller 70 to antenna pattern processor 72. Here, such signal line 74 carries a signal indicating the current heading of the emitter being simulated. In the case where more than one RF emitter is being simulated, the signal line 74 carries a signal indicative of the current heading of the one of the plurality of emitters currently being processed by pulse train controller 70, as will be described below. Also coupled between pulse train controller 70 and antenna pattern processor 72 is a control signal line 76. A "feedback" signal line 78 is coupled from antenna pattern processor 72 to pulse train controller 70 and, here, carries a signal indicative of a new, or updated amplitude of the pulses of RF energy corresponding to the simulated emitter (i.e. the new amplitude signal). Again, if more than one RF emitter is being simulated, the new amplitude signal is associated with the one of the plurality of emitters currently being processed by pulse train controller 70, as will be described.

Generally, in operation, pulse train controller 70 accesses, or retrieves pulse train data information stored in device 12 and establishes a sequence of pulses for generating the digital simulated output signal of line 18. In the case of more than one RF emitter being simulated, the sequence interleaves pulses from each of the RF emitters to be simulated in accordance with the relative timing of such pulses. In other words, referring briefly back to FIG. 4, if two emitters having pulse train signals $P_1(t)$ and $P_2(t)$ associated therewith are sought to be simulated, the pulse train signals thereof would be "overlaid" to generate the sequence of pulses referred to above. Note however, that this sequence of pulses is established without computing and storing pulse train signals $P_1(t)$ and $P_2(t)$, as in the embodiment of FIG. 3A.

In order to account for the antenna characteristics and scanning pattern of the simulated emitters, pulse train controller 70 further processes the above described sequence of pulses by appropriately weighting, or scaling the amplitude $a_i$ thereof. More particularly, here, pulse train controller 70 generates a control signal for controlling, or triggering this weighting process by which the amplitude $a_i$ is updated. In response to conditions described below, the control signal of line 76 triggers antenna pattern processor 72 to update the amplitude $a_i$ associated with the pulse train characteristics of emitter (i) in accordance with corresponding antenna and scanning data to provide the new amplitude signal. In other words, in response to the control signal (line 76), a new amplitude signal is fed from antenna pattern processor 72 to pulse train controller 70, via signal line 78. Such new amplitude signal is then used to update the pulses contained in the pulse sequence of pulse train controller 70 and associated with the same emitter as the new amplitude signal. Since the pulse train information maintained in the sequence of pulse train controller 70 is updated in accordance with the antenna and scanning information, the digital simulated output signal of line 18 is representative of the RF pulses of energy, the antenna characteristics, and the scanning pattern of the simulated emitters. Note that the current heading signal carried by signal line 74 to antenna pattern processor 72, is used for generating the new amplitude signal, as will be described below.

Figure 5:
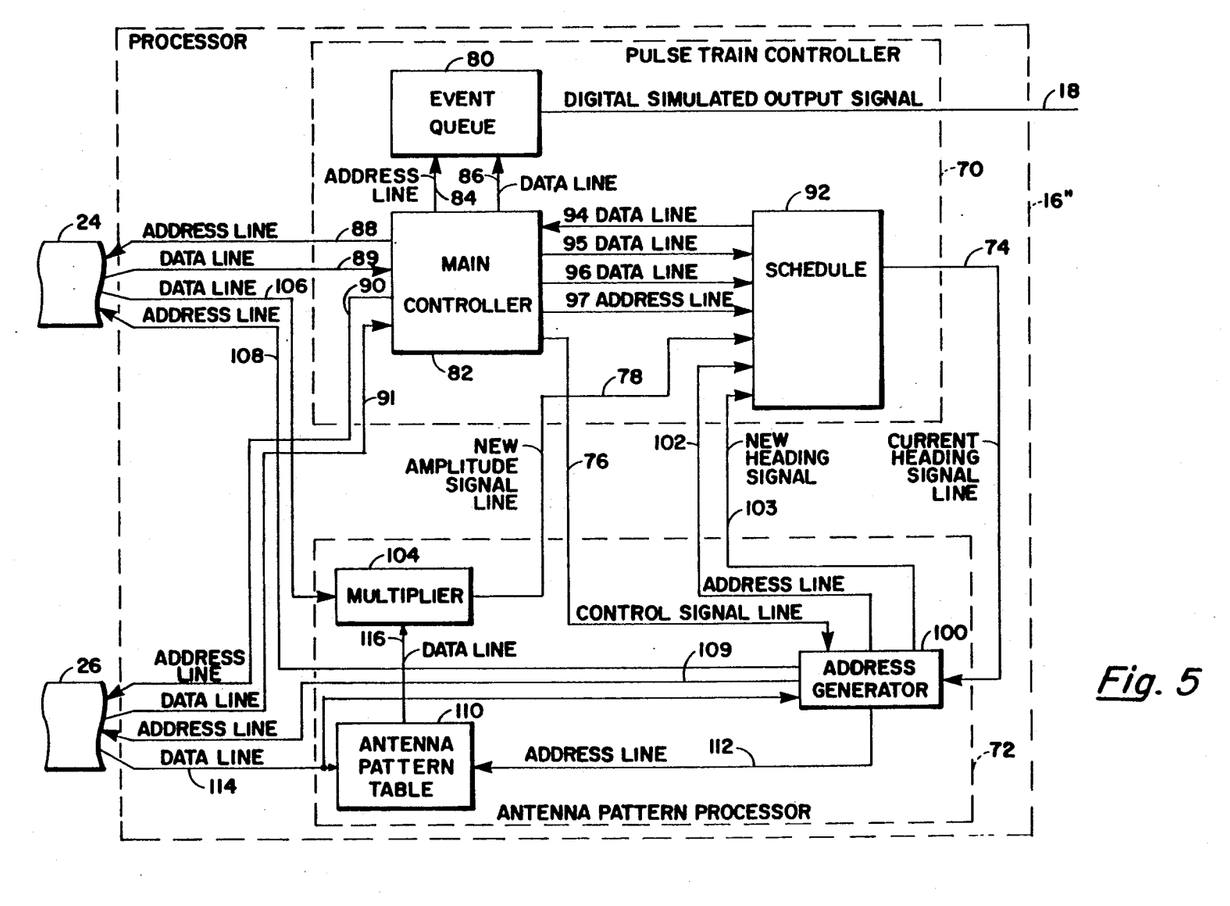
FIG. 5 is a detailed block diagram of the processor of FIG. 3B.

The operation of processor 16'' will now be described in greater detail in conjunction with FIG. 5. Note that processor 16'' may be a digital signal processor, or microprocessor, such as a commercially available DSP-16A microprocessor. The pulse train controller 70 of processor 16'' is shown to include a main controller 82 and a memory device, here a RAM, labelled event queue 80. The digital simulated output signal carried by signal line 18 is provided at an output of event queue 80. A second memory device 92, here also a RAM, is also contained within pulse train controller 70 and will hereinafter be referred to as the schedule 92. It should be noted that the RAM comprising event queue 80 and schedule 92 may be separate devices or an integral part of the processor 16''. Main controller 82 is coupled to the pulse train data storage device 12 (FIG. 1) via signal bus 24 and to antenna data storage device 14 (FIG. 1) via signal bus 26.

The antenna pattern processor 72 of processor 16'' is shown to include an address generator circuit 100, a multiplier circuit 104, and an antenna pattern table 110. Antenna pattern processor 72 is coupled to pulse train data storage device 12 (FIG. 1) by signal bus 24 and antenna data storage device 14 (FIG. 1) by signal bus 26, as shown.

Pulse train controller 70 and antenna pattern processor 72 are coupled together in a feedback relationship, as described above in conjunction with FIG. 3B. As mentioned, a current heading signal line 74 is fed from pulse train controller 70 to antenna pattern processor 72. More particularly, such current heading signal line 74 is fed to address generator circuit 100 of antenna pattern processor 72, as shown. Pulse train controller 70 and antenna pattern processor 72 are further coupled by control signal line 76, here coupled between main controller 82 and address generator 100. The new amplitude signal provided by antenna pattern processor 72 to pulse train controller 70 (i.e. signal line 78) is generated by multiplier circuit 104 of antenna pattern processor 72 and is fed to the schedule 92 of pulse train controller 70.

Antenna pattern table 110, here includes a PROM and, although shown as an integral part of processor 16'', is here, a separate memory device. Antenna pattern table 110 is used to store the plurality of pre-computed antenna pattern signals referred to above in conjunction with the antenna pattern generator 50 of FIG. 3A. In other words, because of the desirability of reducing the computations processed by simulator 10 and due to the relatively few different typical antenna patterns associated with modern RF emitters, here, antenna pattern table 110 stores a selection of antenna pattern signals, from which an operator at computer 20 can select by entering the appropriate antenna pattern identification parameter. Note, however, that in certain cases, it may be desirable to replace the antenna pattern table 110 (FIG. 5) with the antenna pattern generator 50 (FIG. 3A) in order to provide the option of either entering the desired antenna pattern parameters (i.e. $\lambda$ and n, or beamwidth and sidelobe level) for computation of an antenna pattern signal or selecting from the pre-computed patterns stored in table 110. Here, thirty-two different antenna pattern signals are stored in antenna pattern table 110 and each antenna pattern signal is allocated 1024 bytes of memory. In other words, a 360° antenna pattern signal is quantized at intervals of 360/1024 and stored in antenna pattern table 110. Thus, each entry represents an angle of rotation of the emitter's antenna, or an angle bin, of approximately 0.352°.

In operation, when simulator 10 is initialized, main controller 82 addresses pulse train data storage device 12 (FIG. 1) by address line 88 to retrieve the entered and stored set (or sets, in the case of the simulation of multiple emitters) of pulse train data via data line 89. In response to such sets of parameter values, main controller 82 loads the schedule 92 with the sequence of pulses referred to generally above. More particularly, a "pulse item" is inserted into the schedule 92, via data line 95 at an address defined by address line 97, for each pulse defined by such parameter values. Specifically, each pulse item includes both amplitude and width information. Thus, the number of active pulse items depends on how many emitters are being simulated as well as the number of pulses per emitter. Associated with each pulse item, and inserted into the schedule 92 via data line 96 in accordance with address line 97, is a time remaining variable. The time remaining variable indicates the timing of the corresponding pulse item relative to other items contained in the schedule 92.

Also when simulator 10 is initialized, main controller 82 addresses antenna data storage device 14 (FIG. 1) by address line 90 to retrieve antenna data via data line 91. In response to such data, main controller 82 inserts a "scan item" into schedule 92 via data line 95 at an address defined by address line 97. More particularly, one scan item is inserted for each emitter to be simulated. A scan item contains a heading variable representative of the current heading of the emitter relative to the radar system receiver. The initial heading variable is a function of the offset of the emitter from the boresight of the receiver as entered by an operator of computer 20. Essentially, a scan item is a time marker that indicates when to update the amplitude of associated pulse items contained in the schedule 92. In simple terms, this updating becomes necessary when sufficient time has lapsed to allow the simulated emitter to rotate through one angle bin in the corresponding antenna pattern signal. More particularly, each scan item has a time remaining variable associated therewith, such variable corresponding to the dwell time, or the time it takes the emitter to rotate through one angle 15 bin. The time remaining variable is inserted into schedule 92 via data line 96, in accordance with address line 97.

Thus, the schedule 92 is a linked list, or sequence of all pulse items and scan items which are currently active in the simulation. In other words, for a given simulation, the number of items contained in the schedule 92 is fixed. However, the order of the items in the schedule 92 is constantly changing as each item (both scan items and pulse items) reaches the top of the schedule 92 (i.e. has the least time remaining associated therewith relative to other items in schedule 92), is retrieved, and is inserted back into the schedule 92.

Items are inserted back into the schedule 92 as a function of the FRI or the dwell time of the item. More particularly, if the item being inserted is a pulse item, it is the FRI associated therewith which determines where in the schedule 92 the pulse item is inserted. Specifically, the FRI and the value of the time remaining variable when the pulse item is retrieved determine the location for reinsertion into schedule 92. However, if the item being reinserted is a scan item, it is the dwell time which determines where in the schedule 92 such scan item will be inserted. Again, more specifically it is the dwell time and the value of the time remaining variable when the scan item is retrieved which determine the location for reinsertion into schedule 92. For example, a pulse item with a relatively large FRI (and similarly a scan item with a relatively long dwell time) is likely to be inserted near the bottom of the schedule 92 due to the relatively long time remaining variable associated therewith, while smaller FRI pulse items (and similarly shorter dwell time scan items) are likely to be inserted near the top of the schedule 92.

As an example, consider the case where RF emitters one and two (FIG. 4) are to be simulated. In this case, the entries of schedule 92 after initialization are as shown below in table 1.

TABLE 1

| Emitter (i) | Type | Item Data | Time Remaining |
|---|---|---|---|
| 2 | pulse | $a_i = 1; w_i(n) = 2$ | 0 |
| 1 | pulse | $a_i = 1; w_i(n) = 1$ | 2 |
| 2 | pulse | $a_i = 1; w_i(n) = 2$ | 3 |
| 1 | pulse | $a_i = 1; w_i(n) = 1$ | 5 |
| 2 | scan | Heading | 8 |
| 1 | scan | Heading | 10 |

Thus, at time $t=0$, a pulse associated with emitter $i=2$ occurs, having an amplitude of one and a width of two. At time $t=2$, a pulse occurs having an amplitude of one, a width of one, and being associated with emitter $i=2$. As is apparent, the schedule 92 contains a pulse item for each pulse of each emitter to be simulated and also a scan item associated with each emitter to be simulated. Note that the time remaining variable is unitless in the sense that such variable is intended to be a relative measure of the timing of the pulse items and scan items relative to other entries in schedule 92.

Having described the initialization of the processor 16'', the operation thereof will now be described. In operation, when a pulse item reaches the top of the schedule 92 (i.e. has a smaller time remaining variable associated therewith than other items in schedule 92), its data (i.e. amplitude and width) are retrieved by main controller 82 via data line 94. In response to the amplitude and width data of a pulse item, digital signal processor 82 creates a rising edge event and a falling edge event, such events being separated by the width of the pulse. More particularly, these events are inserted into the event queue 80 via data line 86 and at a location thereof in accordance with address line 84. Event queue 80 contains a sequence of entries, each of such entries having an amplitude value associated therewith corresponding to the instantaneous amplitude of the digital simulated output signal of line 18. Moreover, each entry in event queue 80 has a time remaining variable associated therewith representing the "real time" when the amplitude of such entry provides the digital simulated output signal of line 18.

The above description represents the method by which pulse train controller 70 processes pulse train data for one, or a plurality of emitters. However, it is apparent from the discussion of the embodiment of FIG. 3A and the digital simulated output signal shown in FIG. 4, that the pulse train data must be multiplied, or weighted by the antenna data associated therewith. Here, in response to the control signal carried by signal line 76, antenna pattern processor 72 generates a new amplitude signal carried by signal line 78 to schedule 92 in response to which the amplitude of the pulse items contained therein, and associated with the corresponding emitter, is updated.

More particularly, when a scan item is at the top of schedule 92 (i.e. when a scan item has a smaller time remaining variable associated therewith than other items in schedule 92) and is retrieved by main controller 82 via data line 94, a control signal of line 76 is provided to trigger antenna pattern processor 72 to generate a new amplitude signal. In response to the control signal of line 76, address generator circuit 100 generates an address signal carried by address line 112 to antenna pattern table 110. In response to such address, antenna pattern table 110 provides the antenna pattern data associated with such address (i.e. the amplitude scaling factor) to multiplier 104 via data line 116.

More particularly, the way in which address generator circuit 100 generates the address signal carried by line 112 will now be described. In response to the control signal carried by signal line 76, address generator 100 addresses pulse train data storage device 12 (FIG. 1) via address line 108 and antenna data storage device 14 (FIG. 1) via address line 109 to retrieve certain parameter values. Specifically, in response to the address signal of line 108, the amplitude parameter value stored in device 12 and associated with the same emitter as the scan item being processed, is provided to multiplier 104 via data line 106. In response to the address signal of line 109, the antenna pattern identification parameter and the scan type parameter associated with the processed emitter are provided to address generator 100 via data line 114.

The current heading signal of line 74 is updated in accordance with the scan type parameter value to provide a new heading signal via data line 103. More particularly, if the scan type parameter indicates a steady scan type, the new heading signal is the same as the current heading signal. If the scan type is circular, the current heading is incremented by one to generate the new heading. Furthermore, if the emitter is sector scanning, the current heading is incremented by one for a predetermined number of updates and is then decremented by one for a predetermined number of updates to provide the new heading signal. The predetermined number of updates is a function of the angular limits associated with the sector scan pattern, as entered on computer 20 and as mentioned above in conjunction with FIG. 2B. The new heading signal is then provided to schedule 92 via data line 103.

In response to the new heading signal and the antenna pattern identification parameter, address generator 100 addresses antenna pattern table 110 via address line 112. More particularly, the antenna pattern identification parameter determines which of the, here thirty-two, antenna patterns stored in table 110 is to be accessed. Moreover, the new heading signal determines from where, along such antenna pattern, a data point (i.e. the scaling factor) is retrieved.

As mentioned, in response to address line 112, antenna pattern table 110 retrieves the addressed antenna pattern sample and provides such sample, or weighting factor to multiplier 104 via data line 116. The amplitude carried by line 106 is then multiplied by the scaling factor of line 116 and the product of such multiplication yields the new amplitude signal carried by data line 78 to schedule 92. In response to the new amplitude signal, as well as an address signal provided to schedule 92 by address generator 100 via address line 102, the amplitude of the pulse items contained in schedule 92, and associated with the currently processed emitter, is replaced with the new amplitude.

Figure 6:
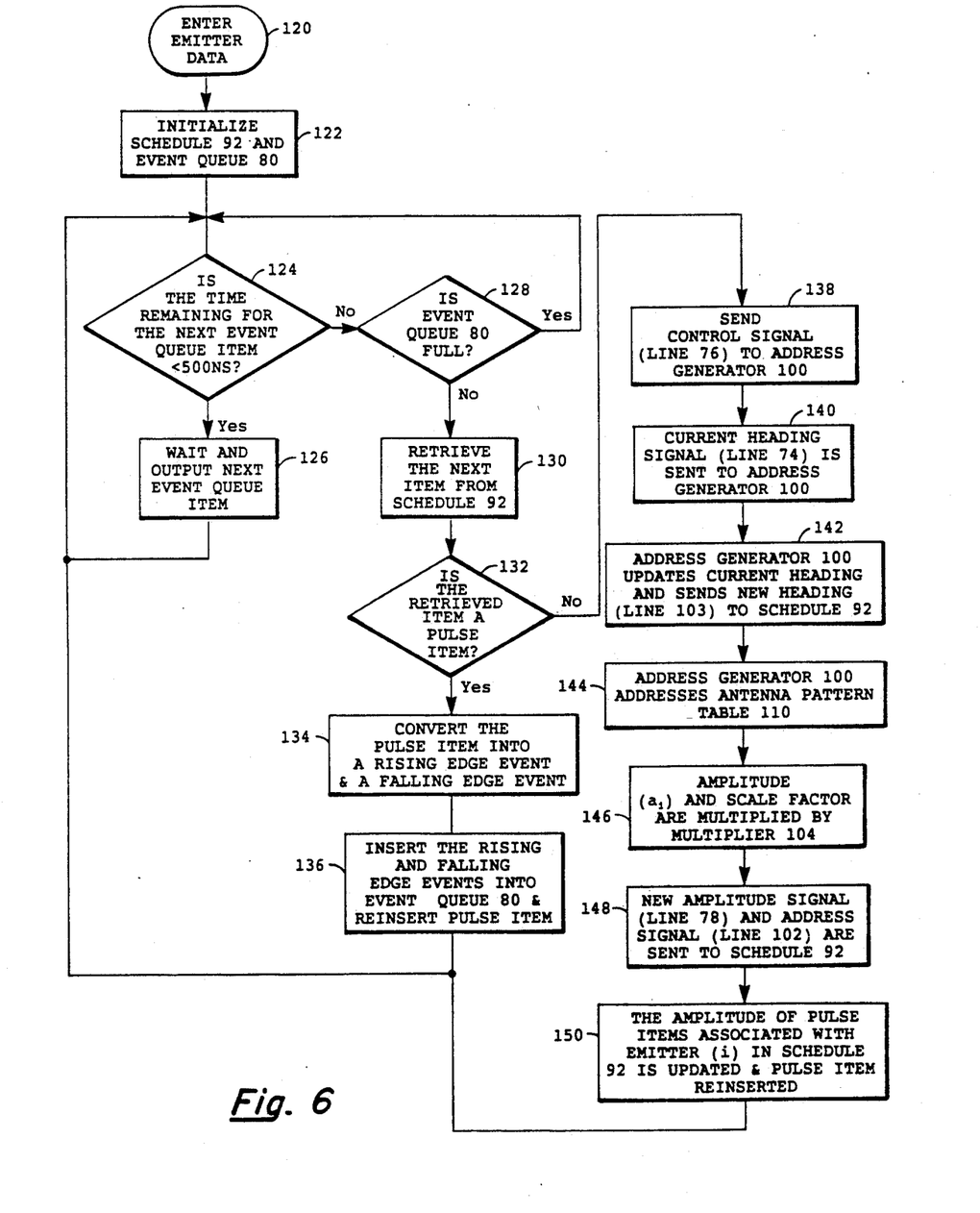
FIG. 6 is a simplified flow diagram of the operation of the processor of FIG. 3B.

The above overview of the operation of processor 16,, may be more clearly understood by referring now to a simplified flow diagram shown in FIG. 6. In step 120, an operator at computer 20 enters the pulse train data and the antenna data mentioned above and stored in memory unit 11 (FIG. 1). More particularly, for each RF emitter to be simulated, a set of pulse train parameter values is stored in a file 12a–12h of pulse train data storage device 12 and a set of antenna parameter values is stored in a file 14a–14h of antenna data storage device 14. Once such data is entered, step 122 is executed in which main controller 82 initializes the schedule 92 and the event queue 80. The schedule 92 is initialized by the insertion of pulse items and scan items therein, as described above and shown in Table 1. Event queue 80 is initialized by the insertion therein of events from schedule 92 and corresponding to those pulse items having the smallest value of time remaining associated therewith.

Once the schedule 92 and the event queue 80 are initialized, step 124 is executed in which the main controller 82 determines whether the next item in the event queue (i.e. that having the least time remaining associated therewith) has a time remaining of, here, less than 500 nanoseconds associated therewith. In the case where such next event queue item has a time remaining variable of less than 500 nanoseconds associated therewith, step 126 is subsequently executed. In step 126, main controller 82 waits for such time remaining to be zero and outputs such next event queue item (i.e. the amplitude associated therewith) on signal line 18 to provide a sample of the digital simulated output signal. Subsequently, step 124 is reexecuted, as shown.

Consider the case where, in step 124, it is determined that the time remaining variable associated with the next event queue item is, here, greater than 500 nanoseconds. Here, step 128 is executed in which main controller 82 determines whether the event queue 80 is full. If the event queue 80 is full, processor step 124 is again reexecuted. However, if the event queue 80 is not full, step 130 is next executed in which the next item is retrieved from schedule 92. More particularly, that item at the top of the schedule 92, or having the least time remaining variable associated therewith, is retrieved. Subsequently, step 132 is executed in which main controller 82 determines whether such retrieved item is a pulse item.

If the retrieved item is a pulse item, step 134 is next executed. In step 134, in response to such pulse item, and more particularly the amplitude and width associated therewith, a rising edge event and a falling edge event, separated in time by the pulse width, are created. Subsequently, in step 136, such rising and falling edge events are inserted into the event queue 80 along with a corresponding time remaining variable, as described above. Also in step 136, the pulse item is inserted back into schedule 92. More particularly, such pulse item is inserted back into schedule 92 with a time remaining variable of the FRI plus the time remaining when such pulse item was retrieved from schedule 92 (i.e. in step 30). Once the pulse item is inserted back into schedule 92, process step 124 is again reexecuted.

Going back to step 132, if the retrieved item is not a pulse item (i.e. is, instead a scan item) step 138 is next executed. In step 138, main controller 82 sends a control signal, via control signal line 76, to the address generator circuit 100. Subsequently, in step 140, the current heading signal associated with the same emitter as the scan item being processed is provided to address generator circuit 100 via signal line 74. In step 142, the address generator circuit 100 updates the current heading in response to the scan type parameter value, as described above. For example, if a circular scan type is indicated, the current heading is incremented by one. Additionally, the new, updated heading is provided to schedule 92 via data line 103 and in accordance with address line 102. More particularly, the new heading is part of the scan item inserted back into schedule 92, as will be described. In response to the new heading and to the antenna pattern identification parameter, address generator 100 addresses the antenna pattern table 110, as shown in step 144. Subsequently, in step 146, the amplitude $a_i$ and the data sample retrieved from the antenna pattern table 110 (i.e. the scale factor) are sent to multiplier circuit 104. More particularly, the scale factor is provided to multiplier 104 via data line 116 and the amplitude $a_i$ is provided to multiplier circuit 104 by data line 106. In step 146, the amplitude $a_i$ and the scale factor are multiplied together and the product of such values generates the new amplitude signal carried by signal line 78. The new amplitude signal is coupled to the schedule 92 by signal line 78 and an address signal is coupled to schedule 92 by address line 102 in step 148. In response to such signals, the amplitude of the pulse items contained in schedule 92 and corresponding to the currently processed emitter, is updated. More particularly, in step 150, such amplitudes are replaced with the new amplitude. Also in step 150, the scan item is inserted back into the schedule 92 with a time remaining variable equal to the dwell time of the corresponding emitter plus the time remaining when such scan item was retrieved from schedule 92 (i.e. in step 130). Once the scan item has been inserted back into schedule 92, processor step 124 is repeated, as shown.

The digital simulated output signal is generated by the items, or entries of event queue 80. More particularly, each event in event queue 80 has an amplitude and a time remaining variable associated therewith. A real time clock (not shown) governs the generation of the digital simulated output signal of line 18 in response to such amplitudes and at a time corresponding to the time remaining variable.

Having described preferred embodiments of the invention, it should now become evident to one of skill in the art that other embodiments incorporating its concepts may be used. It is felt, therefore, that this invention should not be restricted to the disclosed embodiments but rather should be limited only by the spirit and the scope of the appended claims.

What is claimed is:

1. Apparatus for simulating a signal received by a radar system in response to RF energy transmitted by an antenna of an emitter, said RF energy being transmitted as successive groups of pulses, each of said pulses having an amplitude corresponding to the instantaneous angular location of said emitter with respect to said radar system when said pulse is transmitted, said apparatus comprising:

means for storing amplitude information for each pulse in one of said groups of pulses, group interval information representative of the time interval between said groups of pulses, and an antenna characteristic of the emitter; and means responsive to the stored amplitude information and stored group interval information, for producing an amplitude scaled replica of said one of the groups of pulses and a pulse train, such pulse train comprising a sequence of the produced replicas, said produced replicas being spaced in accordance with said stored group interval information.

2. The apparatus recited in claim 1 wherein the apparatus simulates a second signal received by said radar system in response to RF energy transmitted by an antenna of a second emitter, said RF energy transmitted by said second emitter being transmitted as successive second groups of pulses, each of said pulses in said second groups having an amplitude corresponding to the instantaneous angular location of said second emitter with respect to said radar system when said pulse is transmitted, said apparatus further comprising:

means for storing amplitude information for one of the second groups of pulses and group interval information for said second emitter;

means, responsive to the stored amplitude information and stored group interval information of said second emitter for producing an amplitude scaled replica of said one of the second groups of pulses and a second pulse train, such second pulse train comprising a sequence of the produced replicas, said produced replicas being spaced in accordance with said group interval information for said second emitter.

3. The apparatus recited in claim 1 further comprising means, fed by said storing means, for scaling, at a predetermined interval, the stored amplitude information in accordance with the stored antenna characteristic.

4. The apparatus recited in claim 3 wherein said predetermined interval corresponds to the rate of movement of said antenna of the emitter.

5. A method for simulating a signal received by a radar system in response to RF energy transmitted by an antenna of an emitter, said RF energy being transmitted as successive groups of pulses, each of said pulses having an amplitude corresponding to the instantaneous angular location of said emitter with respect to said radar system when said pulse is transmitted, said method comprising the steps of:

storing amplitude information for each pulse in one of said groups of pulses, group interval information representative of the time interval between said of groups of pulses, and an antenna characteristic of the emitter; and generating an amplitude scaled replica of said one of the groups of pulses and generating a pulse train comprising a sequence of the produced replicas, such produced replicas being spaced in accordance with said group interval information.

6. The method of claim 5 further comprising the step of scaling, at a predetermined interval, the stored amplitude information in accordance with the stored antenna characteristic.

7. The method of claim 6 wherein said predetermined interval corresponds to the rate of movement of said antenna of the emitter.

8. The method recited in claim 6 wherein said scaling step comprises the steps of:

retrieving a sample of said stored antenna characteristic, said sample corresponding to the instantaneous angular location of the emitter with respect to the radar system; and multiplying said antenna characteristic sample with said stored amplitude information to provide scaled amplitude information.

9. Apparatus for simulating a signal received by a radar system in response to RF energy transmitted by an antenna of an emitter, said RF energy being transmitted as pulses, said apparatus comprising:

means for storing amplitude information for said pulses, a characteristic of the antenna of the emitter, heading information representing the instantaneous angular location of the emitter with respect to the radar system, and a dwell time variable related to the rate of movement of the emitter;

means, responsive to said stored heading information, for scaling said stored amplitude information in accordance with said stored antenna characteristic and at an interval related to said dwell time variable; and controller means, fed by said storing means, for generating the simulated signal in response to said scaled amplitude information.

10. The apparatus recited in claim 9 wherein said storing means further includes means for storing an antenna pattern signal representing the antenna characteristic of the emitter and wherein said scaling means comprises means for multiplying said stored amplitude information by a sample of said antenna pattern signal, said sample being selected in accordance with said heading information.

* * * * *